US010936355B2

(12) United States Patent
Sankaran et al.

(10) Patent No.: US 10,936,355 B2
(45) Date of Patent: Mar. 2, 2021

(54) VIRTUAL MACHINE ALLOCATION ANALYSIS FOR PHYSICAL NETWORK DEPLOYMENTS

(71) Applicant: DELL PRODUCTS L.P., Round Rock, TX (US)

(72) Inventors: Ganesh Chennimalai Sankaran, Chennai (IN); Balaji Venkat Venkataswami, Chennai (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 16/373,291

(22) Filed: Apr. 2, 2019

(65) Prior Publication Data

US 2020/0319906 A1   Oct. 8, 2020

(51) Int. Cl.
*G06F 9/455* (2018.01)
*H04L 12/24* (2006.01)
(Continued)

(52) U.S. Cl.
CPC .......... *G06F 9/45558* (2013.01); *G06F 9/505* (2013.01); *G06F 9/5077* (2013.01);
(Continued)

(58) Field of Classification Search
CPC .......... G06F 11/3051; G06F 11/3409; G06F 2009/4557; G06F 2009/45575; G06F 9/45558; G06F 9/5077
See application file for complete search history.

(56) References Cited

U.S. PATENT DOCUMENTS

2009/0222560 A1\* 9/2009 Gopisetty ................. G06F 8/60
 709/226
2012/0131176 A1\* 5/2012 Ferris .................... G06F 9/5072
 709/224

(Continued)

OTHER PUBLICATIONS

Stephen J. Bigelow, "Achieve the best VM networking performance," Jul. 31, 2017, [online] Retrieved from Internet<URL: https://searchservervirtualization.techtarget.com/answer/Achieve-the-best-VM-networking-performance>. (2pgs).

(Continued)

*Primary Examiner* — Shean Tokuta
(74) *Attorney, Agent, or Firm* — North Weber & Baugh LLP

(57) ABSTRACT

Embodiments of the present disclosure comprise considering the performance of an application under different candidate physical network topology configurations for a set of virtual machines (VMs) for an application. Given different physical network topologies corresponding to the logical topology for the application, each physical network topology may be analyzed to quantify the performance of the application based upon one or more metrics. In one or more embodiments, the metrics may include throughput, latency, and network resource usage, and these metrics may be formed into a performance set. The set of values provide a means by which the different physical network topology deployments may be compared. Based upon the comparison, a deployment of the VMs on the physical network topology may be selected and implemented; or alternatively, when input expected application performance parameters are satisfied by the metrics, the corresponding physical topology may be chosen.

20 Claims, 11 Drawing Sheets

(51) Int. Cl.
  *H04L 12/26* (2006.01)
  *G06F 11/34* (2006.01)
  *G06F 9/50* (2006.01)
  *G06F 11/30* (2006.01)

(52) U.S. Cl.
  CPC ...... *G06F 11/3006* (2013.01); *G06F 11/3409* (2013.01); *H04L 41/12* (2013.01); *H04L 41/14* (2013.01); *H04L 43/0817* (2013.01); *G06F 2009/4557* (2013.01); *G06F 2009/45575* (2013.01)

(56) References Cited

U.S. PATENT DOCUMENTS

| | | | | |
|---|---|---|---|---|
| 2012/0131193 A1* | 5/2012 | Ferris | .................... | G06F 9/5072 709/226 |
| 2012/0303814 A1* | 11/2012 | Ferris | .................... | H04L 41/042 709/226 |
| 2013/0159637 A1* | 6/2013 | Forgette | ................ | G06F 3/0631 711/154 |
| 2015/0256439 A1* | 9/2015 | Bragstad | ............... | H04L 67/025 709/226 |
| 2017/0078366 A1* | 3/2017 | Jung | .................... | H04L 41/5051 |
| 2017/0199752 A1* | 7/2017 | Cao | ..................... | G06F 9/45558 |
| 2017/0230306 A1* | 8/2017 | Cropper | ................ | G06F 9/5083 |
| 2017/0373915 A1* | 12/2017 | Zhang | .................. | H04L 69/166 |

OTHER PUBLICATIONS

Adam Drescher,"Allocating Virtual Machines based on Networking Performance in the Open Networking Laboratory," 2015, [online] Retrieved from Internet<URL: https://www.cse.wustl.edu/%7Ejain/cse567-15/ftp/vmnet/index.html> Retrieved Apr. 10, 2020. (11pgs).

* cited by examiner

600

For a physical network topology, for each pair of consecutive devices or levels, identify a largest delay — 605

Determine maximum delay for the physical network topology from the lowest tier of the physical network topology to the top tier — 610

FIG. 6

VIRTUAL MACHINE ALLOCATION ANALYSIS FOR PHYSICAL NETWORK DEPLOYMENTS

BACKGROUND

The present disclosure relates generally to information handling systems. More particularly, the present disclosure relates to virtual machine (VM) allocation to satisfy application performance based on topology differences.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Typically, a virtual machine (VM) manager receives a request for allocation of a set of VMs for an application. In such cases, the VM manager typically queries the available VMs that fit the given application requirements. Further strategies, such as proximal placement, may be applied to account for network performance to find the best fit among the VMs. This is broadly known as VM allocation and is a well-known problem.

When allocating VMs, their placement and server resource availability may be considered. However, current approaches have very limited insights. Typically, these approaches may be aware of potential over-subscription results, which tends to result in degradation; however, these approaches have not attempted to quantify the application performance degradation.

In additional, very few works consider network resource usage as part of the allocation process. And, even the very few that do consider network resources, such approaches also fail to quantify the application performance degradation due to sub-optimal VM placement.

Accordingly, it is desirable to provide improved systems and methods for analyzing VM placement within a network environment.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

FIG. 6 depicts an example methodology for performing a latency (or delay) analysis, according to embodiments of the present disclosure.

DETAILED DESCRIPTION

Figure 1:
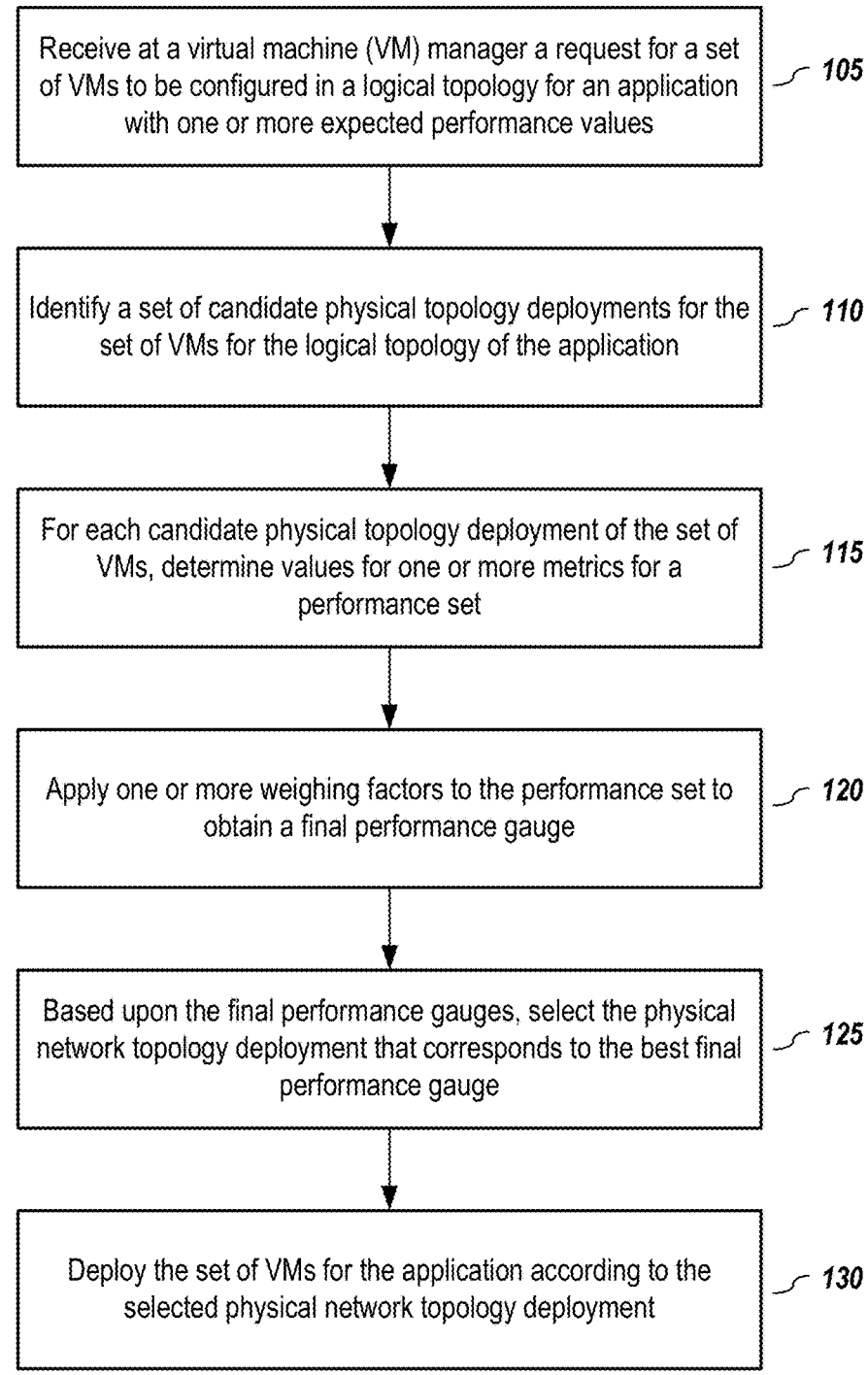
FIG. 1 ("FIG. 1") depicts a method for gauging different physical network topologies for an application deployment, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists that follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. The terms "packet" or "frame" shall be understood to mean a group of bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell."

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. All documents cited herein are incorporated by reference herein in their entirety.

It shall also be noted that although embodiments described herein may be within the context of virtual machines, aspects of the present disclosure are not so limited. Accordingly, aspects of the present disclosure may be applied or adapted for use in other contexts.

As noted above, when a virtual machine (VM) manager receives a request for allocation of a set of VMs for an application, it is preferable that the VM manager ascertain a placement of the VMs so that the performance of the VMs once deployed fits the given application requirements. Failure to adequately quantify the application performance of a deployment may result in significant performance issues due to sub-optimal VM placement.

A. Physical Topology Deployment Analysis Embodiments

To address the deficiencies of prior approaches, embodiments of the present disclosure comprise considering the performance of an application under different candidate physical network topology configurations for a set of VMs for an application. Given different physical network topologies corresponding to a logical topology for the application, each physical network topology may be analyzed to quantify the performance of the application based upon one or more metrics.

FIG. 1 depicts a method for gauging different physical network topologies for an application deployment, according to embodiments of the present disclosure. In one or more embodiments, a virtual machine (VM) manager receives (105) a request for a set of VMs to be configured in a logical topology for an application. The application may have one or more expected performance values, such as throughput or delay.

Given the request, in one or more embodiments, the VM manager identifies (110) a set of candidate physical topology deployments for the set of VMs for the application that could be implemented. In one or more embodiments, for each candidate physical topology deployment of the set of VMs, the VM manager may evaluate or determine (115) values for one or more metrics for a performance set.

In one or more embodiments, a number of metrics to gauge the performance may be employed, including but not limited to throughput, latency, network resources, and operational cost. One skilled in the art shall recognize that other metrics may be used. In one or more embodiments, the metrics' values form a common gauge that allows for the comparison of the performance of the application under the different physical network topology deployments and can facilitate the ability to determine a best deployment or a set of acceptable deployments.

The set of values may be formed into a performance representation or embedding. For example, in one or more embodiments, the set of values may be formed into a vector in which the metrics are the dimensions of the vector. In this way, a vector for a physical network topology represents the application's performance when the VMs for the application deployment are arrayed in that particularly physical network topology. In one or more embodiments, the metrics for the vector may comprise values representing throughput, latency, and network resources values. Embodiments of methods for obtaining values for these metrics are provided in more detail in the following sections.

It should be noted that, given a performance representation for a physical network deployment, one or more weighing factor may be applied (120) to the performance representation to obtain a weighted performance gauge. For example, given a vector comprising values representing throughput, latency, and network resources, a weighting factor matrix or vector may be multiplied or added to the vector to weight certain of these metrics higher, lower, or neutral. If, for example, throughput and latency are much more important than network resource usage, the weighting factor applied to the vector may increase the importance of throughput and latency values and/or decrease the weight of the network resource usage. It shall also be noted that the performance metrics may be normalized so that the resultant gauge is within a range (e.g., [0.1]).

In one or more embodiments, the weighting factor may be user selected and/or application specific. For example, an application may be a real-time application that requires delay below a threshold value. Thus, in that instance the weighting factor for delay may be set to highlight its importance in the overall set of metrics.

It should be noted that, in one or more embodiments, a weighting factor may be neutral (e.g., set to 1).

In any event, a final performance gauge is obtained, which may be a single (i.e., scalar) value or may be a set of numbers, such as a vector or matrix representation. Based upon the final performance gauges, the physical network topology deployment that corresponds to the best final performance gauge may be selected (125). In one or more embodiments, this selected physical network topology deployment of the set of VMs may then be deployed (130) for the application.

B. Example Metrics

1. Maximum Achievable Throughput Analysis Embodiments

Figure 2:
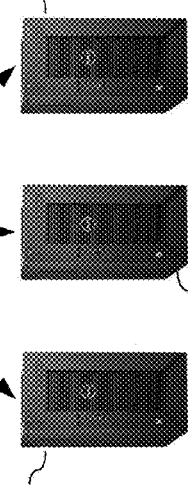
FIG. 2 depicts, by way of illustration, a logical network configuration and a corresponding physical network configuration, according to embodiments of the present disclosure.
Figure 2:
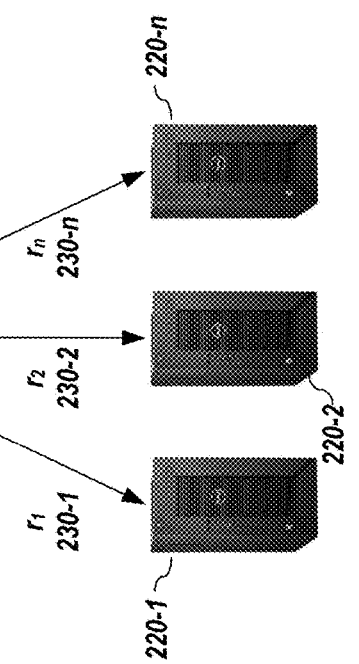

In one or more embodiments, a performance metric that may be used is maximum achievable throughput. In one or more embodiments, the maximum achievable throughput may be based on bottleneck analysis, which may be used to derive the expected degradation in performance. FIG. 2 depicts, by way of illustration, a logical network configuration and a corresponding physical network configuration, according to embodiments of the present disclosure.

Logical network topology 205 depicts a tier-1 level server 215, which is connected to number of tier-2 level servers (i.e., 220-1-220-n). If one considers just the logical network topology, the rate of throughput at the tier-1 level server 215 would be the sum of the rates from each of the tier-2 level server. That is, given rates $r_1$ (230-1) through $r_n$ (230-n) for each of the corresponding tier-2 servers (220-x), then the total throughput at the tier-1 server 215 may be represented as $\Sigma_1^n r_i$ (235).

However, this logical network topology throughput may not represent the actual throughput of the physical network topology. For example, an example physical network topology 210 corresponding to the logical network topology is depicted in network 210. Note that in the depicted physical network topology 210, the throughput from the lower tier servers 220-x to the top of the rack (ToR) 225 is $\Sigma_1^n r_i$; however, it is important to note that throughput from the ToR 225 to the tier-1 level server 215 is $r_t$ 230-T. If the throughput rate of $r_t$ 230-T is less than the throughput demand $\Sigma_1^n r_i$ (235) coming into the ToR 225, then a bottleneck exists. Therefore, in embodiments, the throughput limit for the physical network topology is not $\Sigma_1^n r_i$ (235)—as one might expect in the logical network topology 205—but rather is $r_t$. It should be noted that in some situations, it may be that the throughput limit for the physical network topology is $\Sigma_1^n r_i$ (235) when that value is less than the throughput capacity $r_t$ 230-T.

If the physical network topology deployment includes other existing applications, then the throughput analysis may, in embodiments, also include determining what the residual throughout (or residual capacity) of the links are.

For sake of illustration, assume that there are three tier-2 servers (220-1, 220-2, and 220-n), each with one link (or a link aggregation group, which may be treated as a single link) to the ToR 225. Further assume that each of the link rates $r_1$ (230-1), $r_2$ (230-2), and $r_n$ (230-n) is 10G but due to existing application usage, the capacity of each of the links is 1.5G, 2G, and 2.5G, respectively. Continuing this example, assume that the top link rate of $r_t$ 230-T is 10G, with a residual capacity of 9G. Thus, there is no throughput issue as the throughput from the lower tiers is 6G, while the throughput capacity of the top tier link is 9G.

Now, assume that the residual capacity of each of the lower tier links is the capacity of each of the links is 2.5G, 2G, and 2.5G, respectively, and the residual capacity of the top link of $r_t$ 230-T is only 4.5G. In this instance, the top link is deficient by 7G−4.5G=2.5G. Such instances can occur, especially in Transmission Control Protocol (TCP) incast situations.

In one or more embodiments, a utilization metric, ρ, may be used to ascertain whether bottlenecking may exist in a physical network topology:

$$\rho = \frac{\Sigma \text{ incoming rate}(s)}{\Sigma \text{ outgoing rate}(s)}$$

It should be noted that this ratio may be used both in embodiments that do not consider residual rate (or capacity) or in embodiments that do consider residual rate (or capacity). Where ρ is less than or equal to 1, there is not a bottleneck situation. However, when ρ is greater than 1, then the throughput bottleneck issue exists. In one or more embodiments, back pressure on the lower tier links may be applied in the deployment to reduce their rates so that bottleneck issues may be avoided (or at least reduced if using a statistical back pressure).

Figure 3:
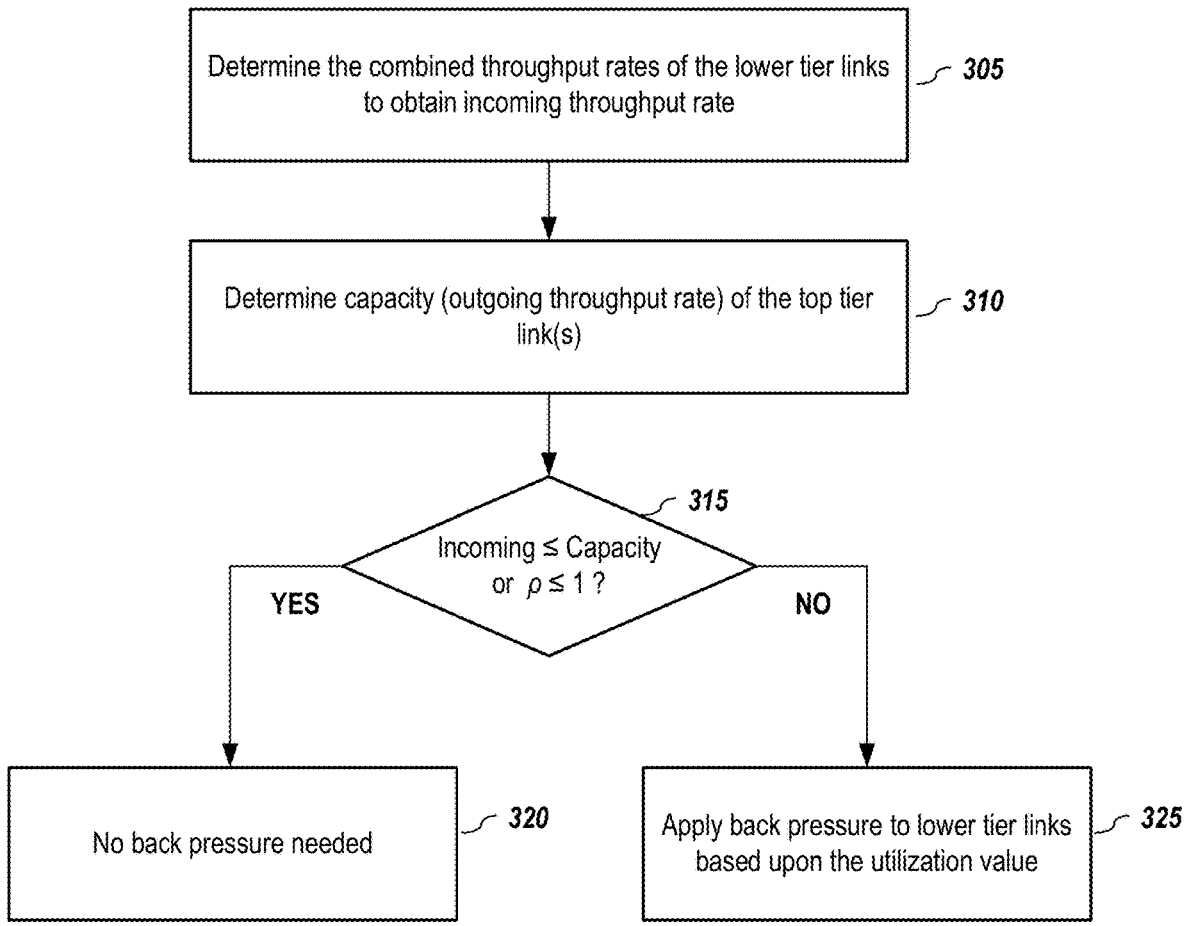
FIG. 3 depicts an example methodology for performing a maximum achievable throughput analysis, according to embodiments of the present disclosure.

FIG. 3 depicts an example methodology for performing a maximum achievable throughput analysis, according to embodiments of the present disclosure. In embodiments, the combined incoming throughput rate from lower tier links is obtained (305). Similarly, the outgoing throughput rate (which may also be referred to herein as capacity, C or $r_t$) from top tier link or links is determined (310). It shall be noted that these rates may or may not consider the residual capacity, although the residual capacity analysis when other applications operate on the same physical network would provide a more accurate depiction.

Given the incoming rate and the capacity, a determination is made (315) whether the incoming rate is less than or equal to the capacity (or, similarly, whether the utilization value, ρ, is less than or equal to 1). If incoming rate is less than or equal to the capacity (i.e., ρ is less than or equal to 1), no back pressure need be applied (320) to the lower tier link rates.

If, however, the incoming rate is greater than the capacity (i.e., ρ is greater than 1), back pressure may be applied (325) to the lower tier link rates. In one or more embodiments, the back pressure may be applied by dividing each of the lower tier rates by ρ. Consider, by way of illustration, the situation depicted in FIG. 4.

Figure 4:
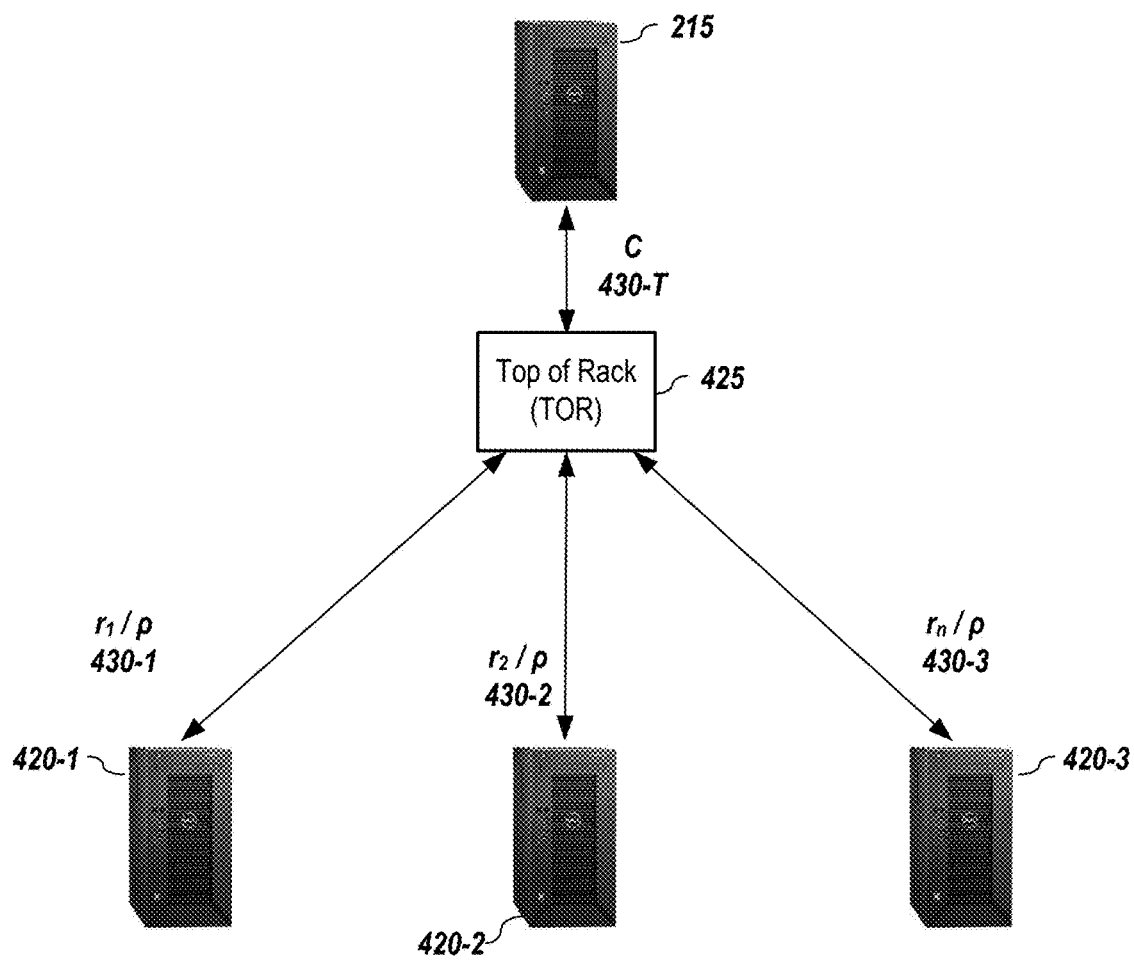
FIG. 4 depicts a physical network topology comprising three tier-2 servers, each with one link to as top-of-rack device, which is connected to a tier-1 server, according to embodiments of the present disclosure.

FIG. 4 depicts a physical network topology 400 comprising three tier-2 servers (420-1, 420-2, and 420-n), each with one link (or a link aggregation group, which may be treated as a single link) to the ToR 425. Further assume that each of the link rates $r_1$ (associated with server 420-1), $r_2$ (associated with server 420-2), and $r_3$ (associated with server 420-3) is 10G but due to existing application usage, the capacity of each of the links is 3G, 3G, and 2G, respectively. Also assume that the top link rate or capacity, C 230-T is only 4G. A utilization value for this system 400 is:

$$\rho = \frac{\Sigma \text{ incoming rate}(s)}{\Sigma \text{ outgoing rate}(s)} = \frac{3G + 3G + 2G}{4G} = \frac{8G}{4G} = 2$$

Since the utilization value is greater than 1, back pressure may be applied to the lower tier links. As depicted, the back pressure may be applied by dividing the lower tier rate by the utilization value to obtain $$\frac{r1}{\rho} 430-1$$

(i.e., 1.5G in this example), $$\frac{r2}{\rho} 430-2$$

(i.e., 1.5G in this example), and $$\frac{r3}{\rho} 430-3$$

(i.e., 1G in this example).

It should be noted that, in embodiments, this analysis considers throughput to be in-phase, so it implicitly considers worst case issues, such as TCP incast problem that is caused when packets from a set of nodes arrive during a very short duration causing buffer overflows on the link to the collection node. In one or more embodiments, the maximum throughput based on logical topology and the maximum achievable throughput based on physical topology are considered in order to derive the fraction of throughput degradation. In one or more embodiments, this may be used as the normalized metric for throughput that fits throughput in a closed range (e.g., [0,1]).

2. Latency Analysis Embodiments

In one or more embodiments, a latency analysis considers latency expected from the logical topology and from the physical network topologies, and the analysis may include deriving an increase in latency due to the choice of physical topology.

Figure 5:
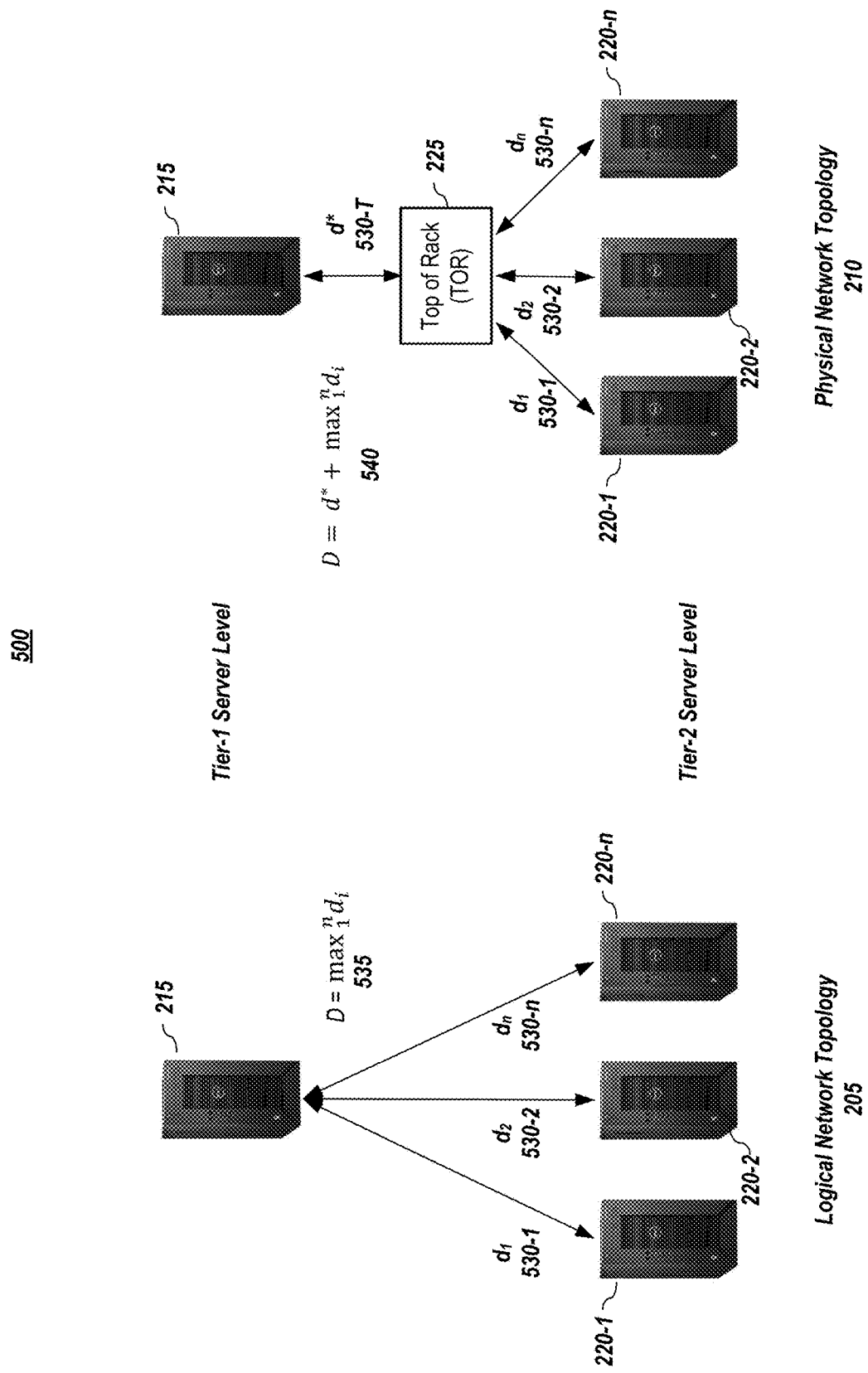
FIG. 5 depicts, to help illustrate a latency analysis, a logical network configuration and a corresponding physical network configuration, according to embodiments of the present disclosure.

FIG. 5 depicts, to help illustrate a latency analysis, a logical network configuration and a corresponding physical network configuration, according to embodiments of the present disclosure. As depicted in FIG. 5, a logical network topology 205 depicts a tier-1 level server 215, which is connected to a number of tier-2 level servers (i.e., 220-1-220-n). If one considers just the logical network topology, the maximum latency, or delay, between the tier-1 level server 215 and the tier-2 level servers is the maximum delay between delays $d_1$ (530-1) through $d_n$ (530-n) for each of the respective tier-2 servers (220-x). In one or more embodiments, this maximum delay, D, may be expressed as:

$$D = \max_1^n d_i$$

In one or more embodiments, the logical latency time may be determined as the time required for largest quantum of data to be transmitted (packetization delay) across the shortest link (propagation delay); effectively this is the sum of best case packetization and propagation delays.

Turning to the corresponding physical network topology 210, in one or more embodiments, the delay analysis should consider the delays of all links along a pathway. For example, turning to FIG. 5, a pathway from tier-2 server 220-1 to the ToR 225 and finally to the tier-1 server 215 has delays from each link, which results in a total delay of $d_1$ 530-1 added with d* 530-T. Thus, for the example physical network topology 210, the maximum delay may be computed as:

$$D = d^* + \max_1^n d_i \quad (540)$$

It should be noted that if a server is further removed (e.g., a tier-4 server), then the additional delays for data traffic to traverse from that server should be included in the combination.

In one or more embodiments, the latency (or delay) metric may be the raw delay or may be expressed as an increase in latency. For example, if the maximum logical delay (or an ideal delay) is $D_{LOGICAL}$ and the maximum actual delay is $D_{PHYS}$, a latency metric may be expressed as:

$$D = \frac{D_{LOGICAL}}{D_{PHYS}}$$

FIG. 6 depicts an example methodology for performing a latency (or delay) analysis, according to embodiments of the present disclosure. As illustrated in FIG. 6, in one or more embodiments, for each pair of consecutive tier levels in a physical network topology, a largest delay between the pair of tier levels is identified (605). For example, referring to FIG. 5, the largest delay between the second-tier level and the ToR level 225 would be $\max_1^n d_i$, and the largest delay between the ToR level and the tier-1 server would be d*.

3. Network Resources Analysis Embodiments

Figure 8:
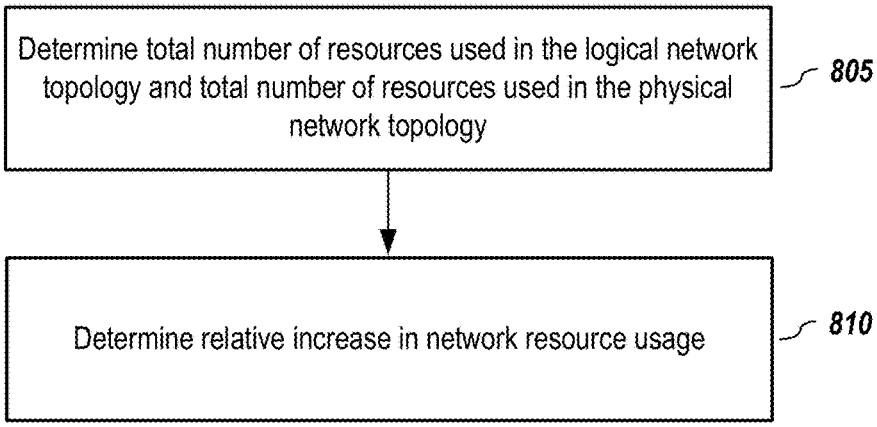
FIG. 8 depicts an example methodology for performing a network resources usage analysis, according to embodiments of the present disclosure.

FIG. 8 depicts an example methodology for performing a network resources usage analysis, according to embodiments of the present disclosure. In one or more embodiments, the number of network resources utilized in the both the logical and physical network topologies may be determined (805). In one or more embodiments, a relative or fraction of increase in network resource usage may be computed (810) as a metric.

Figure 7:
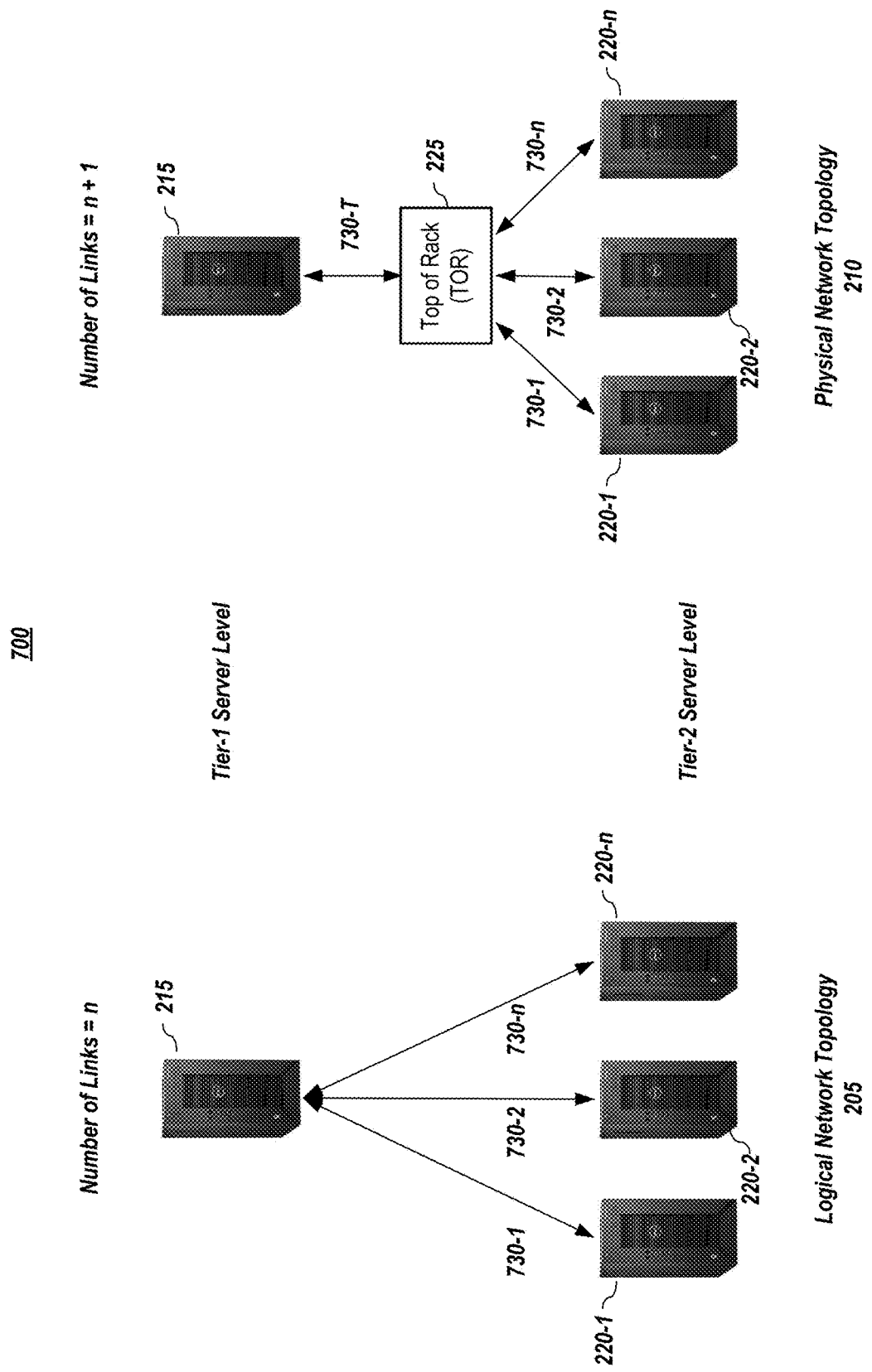
FIG. 7 depicts, to help illustrate a network resource analysis, a logical network configuration and a corresponding physical network configuration, according to embodiments of the present disclosure.

FIG. 7 depicts, to help illustrate a network resource analysis, a logical network configuration 205 and a corresponding physical network configuration 210, according to embodiments of the present disclosure. As depicted in FIG. 7, the logical network topology 205 depicts a tier-1 level server 215 connected to a number of tier-2 level servers (i.e., 220-1-220-n). In the depicted example, the number of links in the logical network topology is n (i.e., links 730-1-730-n). In contrast, the physical network topology 210 includes a ToR 225 between the tier-2 servers 220-x and the top tier server 215. Thus, the number of links is n+1 (i.e., links 730-1-730-n, and 730-T).

It should be noted that, in embodiments, if a link is a link aggregation group, it may be considered as a single link or alternatively may be considered multiple links.

In one or more embodiments, the network resource metric may be the raw usage number or may be expressed as an increase in network resource usage. For example, if the network resource usage for the logical network is $R_{LOGICAL}$ and the network resource usage for the physical network is $R_{PHYS}$, a network resource usage metric may be expressed as:

$$R = \frac{R_{LOGICAL}}{R_{PHYS}}$$

4. Use Case Example

Figure 9:
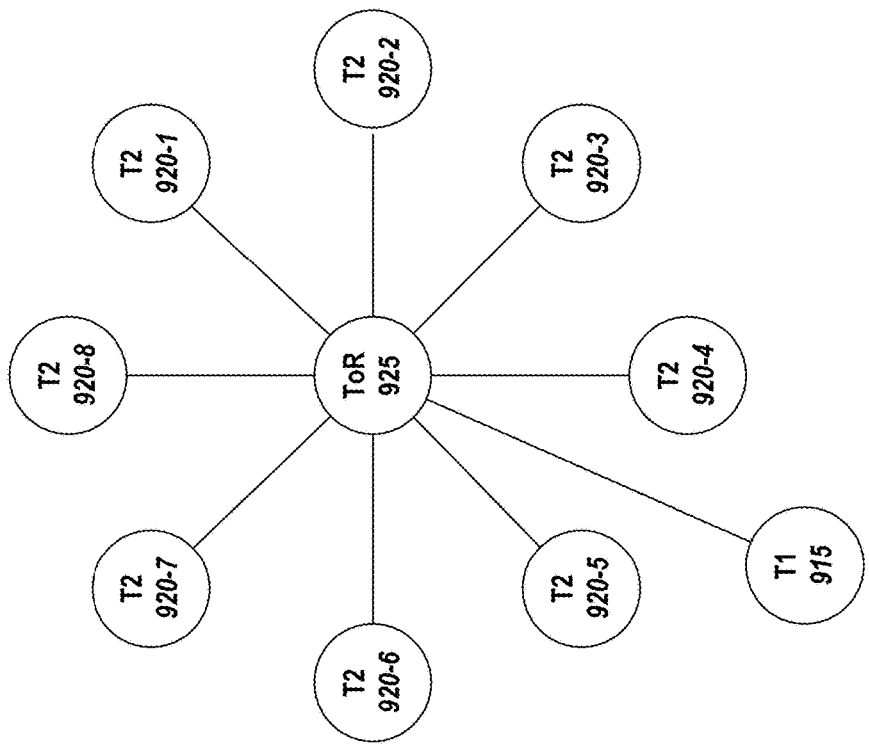
FIG. 9 depicts a logical network configuration and a corresponding physical network configuration, according to embodiments of the present disclosure.
Figure 9:
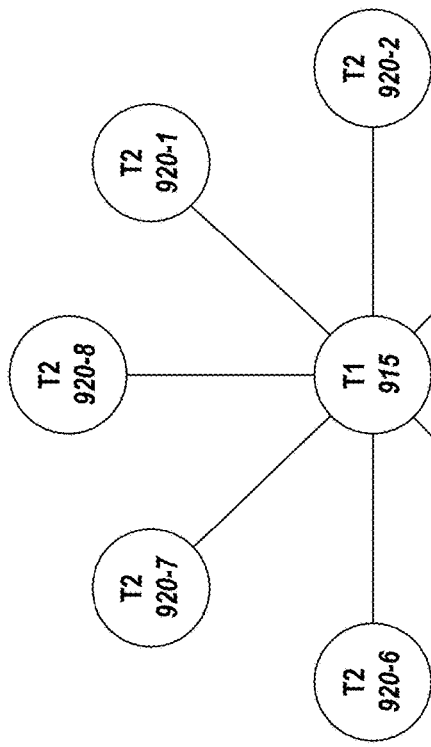

By way of illustration, FIG. 9 depicts a logical network configuration 905 and a corresponding physical network configuration 910, according to embodiments of the present disclosure. As illustrated, the logical network topology where the VMs are operating on a set of tier-2 servers (920-1-920-8) and a tier-1 server 915 in a star-configuration 905. The physical network topology 910 is similar to the logical network topology with the exception that the VMs on the tier-2 servers connect to the tier-1 server 915 via a top-of-rack device 925.

As noted previously, a set of metrics may be obtained, such as maximum achievable throughput, delay, and network resource usage. The metrics provide insight into an application's performance when choosing a set of VMs interconnected by a physical topology. However, depending upon the specific application, certain metric may be more important than others. For example, performance for a backup application may focus on good throughput, with less focus on latency. Similarly, an interactive application may be very sensitive to latency. Thus, the analyses herein help satisfy the input expected application performance parameters, but can also weigh them to identify a corresponding physical topology that best fits the expected application performance parameters.

In one or more embodiments, a weighting may be applied to the obtained metrics before or as part of determining a final performance gauge for a physical network topology. For example, given the topologies depicted in FIG. 9, the following table comprises formulas that may be used for arriving at a final performance gauge:

| Optimization Metric | Example Value | Range | Limiting function | Weight | Remarks |
|---|---|---|---|---|---|
| Max instantaneous throughput | $\frac{1}{\rho}$ | $(0, \infty)$ | $\begin{cases} \tau, \text{ when } T > \tau \\ T \text{ otherwise} \end{cases}$ | $[0, 1]$ | $\tau$ is a predefined threshold |
| Delay | $\frac{d_{max}}{d_{max} + d^*}$ | $(0, 1)$ | NA | $[0, 1]$ | |
| Network resource | $\frac{L}{L+1}$ | $(0, 1)$ | NA | $[0, 1]$ | |

In one or more embodiments, T is a derived maximum achievable throughput (e.g., as discussed previously), and $\tau$ is a user-defined threshold, which may be defined apriori for a specific VM request. For example, in one or more embodiments, $\tau$ may be more than 1 (e.g., 1.2), then any throughput more than 20% of expected performance is limited to 1.2 so that throughput does not dominate the final gauge.

It should be noted that, in embodiments, a vector formed of the values multiplied by the weighting factors would yield a final weighted sum, which is the final performance gauge, that is upper bounded by $\tau+2$ (thereby making it easier for comparison). One skilled in the art shall recognize other ways to obtain the final performance gauge.

For sake of illustration, consider the following:

Maximum Achieve Throughput:

Assume that each of links from the tier-2 servers 920-x to the ToR 925 have a residual capacity of 3G and the link from the ToR 925 to the tier-1 server 915 is 48G residual capacity. In this case, $$\rho = \frac{3 * 8}{48} = \frac{24}{48} = \frac{1}{2}.$$

Since $\rho \leq 1$, there is no need to apply back pressure to the tier-2 links. Finally, the metric may be set at $$\frac{1}{\rho} = 2.$$

Latency:

Assume that the largest delay is between the VM(s) operating on the tier-2 server 920-3 with a latency of 10 milliseconds (ms) and the latency between the ToR 925 and the tier-1 server 915 is 5 ms for a total maximum latency of 15 ms. Further assume that the logical topology maximum latency is expected to be 5 ms, which may be set as a best case latency. Thus, the latency/delay metric may be set at $$D = \frac{5}{15} = \frac{1}{3}.$$

Network Resource Usage:

Assume that the network resource usage is based upon number of links. In case, the network resource usage may be set at $$R = \frac{8}{9}.$$

Vector:

Thus, a performance set vector, P, may be represented as $$\left\{2, \frac{1}{3}, \frac{8}{9}\right\}.$$

Final Performance Gauge:

In one or more embodiments, a function, $f(\bullet)$, may be defined that receives the performance set vector and outputs a final value. In one or more embodiments, the function may a trained function that is trained in a supervised manner by receiving a number of training vectors for topologies and the best physical topology for each of the corresponding logical topologies. Alternatively, an unsupervised, such as clustering, or semi-supervised method may be used to identify a best physical network topology for a logical topology given the input vectors.

In yet another embodiment, a final performance gauge value may be obtained and the best value selected. By way of example, assume that a weighting matrix W with values of <1, 0.1, 0.1> is applied to the performance set vector to obtain the final performance gauge, PG, as follows:

$$PG = W \times P^T = 2.1222$$

Assume that another physical topology has a performance set vector of $$P_2 = \left\{2, \frac{1}{4}, \frac{8}{12}\right\}.$$

Given the same weighting factor, its final performance gauge would be $PG_2 = 2.0917$. Thus, the first physical topology, with a higher final performance gauge value would be the better physical topology.

C. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, etc.) smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 10:
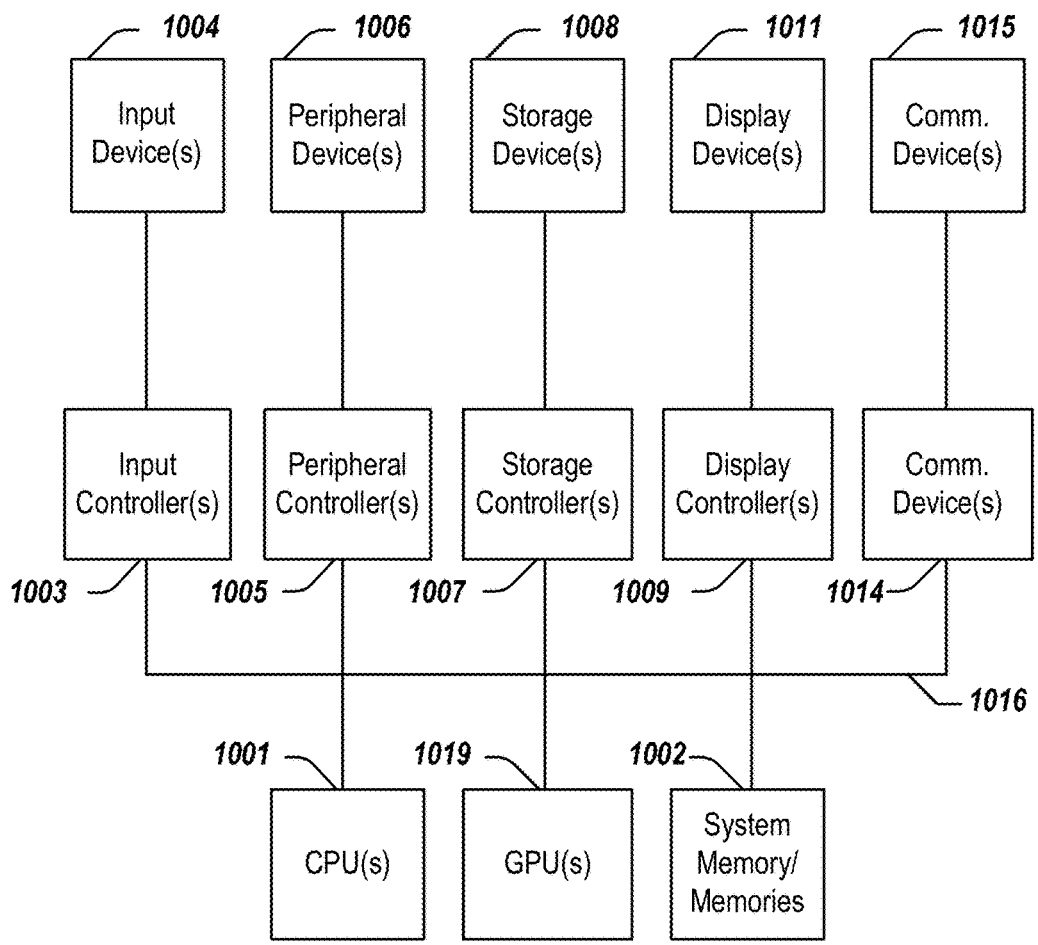
FIG. 10 depicts a simplified block diagram of an information handling system according to embodiments of the present invention.

FIG. 10 depicts a simplified block diagram of an information handling system (or computing system) according to embodiments of the present disclosure. It will be understood that the functionalities shown for system 1000 may operate to support various embodiments of a computing system—although it shall be understood that a computing system may be differently configured and include different components, including having fewer or more components as depicted in FIG. 10.

As illustrated in FIG. 10, the computing system 1000 includes one or more central processing units (CPU) 1001 that provides computing resources and controls the computer. CPU 1001 may be implemented with a microprocessor or the like, and may also include one or more graphics processing units (GPU) 1019 and/or a floating-point coprocessor for mathematical computations. System 1000 may also include a system memory 1002, which may be in the form of random-access memory (RAM), read-only memory (ROM), or both.

A number of controllers and peripheral devices may also be provided, as shown in FIG. 10. An input controller 1003 represents an interface to various input device(s) 1004, such as a keyboard, mouse, touchscreen, and/or stylus. The computing system 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present disclosure. Storage device(s) 1008 may also be used to store processed data or data to be processed in accordance with the disclosure. The system 1000 may also include a display controller 1009 for providing an interface to a display device 1011, which may be a cathode ray tube (CRT), a thin film transistor (TFT) display, organic light-emitting diode, electroluminescent panel, plasma panel, or other type of display. The computing system 1000 may also include one or more peripheral controllers or interfaces 1005 for one or more peripherals 1006. Examples of peripherals may include one or more printers, scanners, input devices, output devices, sensors, and the like. A communications controller 1014 may interface with one or more communication devices 1015, which enables the system 1000 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Figure 11:
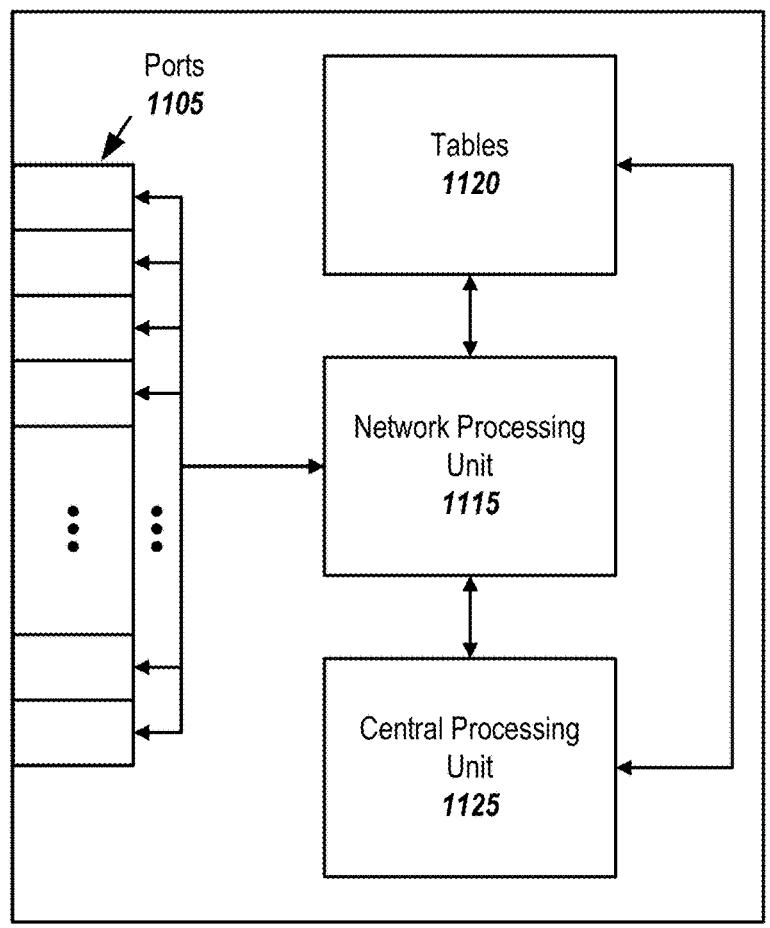
FIG. 11 depicts an alternative block diagram of an information handling system, according to embodiments of the present disclosure.

FIG. 11 depicts an alternative block diagram of an information handling system, according to embodiments of the present disclosure. It will be understood that the functionalities shown for system 1100 may operate to support various embodiments of the present disclosure—although it shall be understood that such system may be differently configured and include different components (including fewer or more components).

The information handling system 1100 may include a plurality of I/O ports 1105, a network processing unit (NPU) 1115, one or more tables 1120, and a central processing unit (CPU) 1125. The system includes a power supply (not shown) and may also include other components, which are not shown for sake of simplicity.

In one or more embodiments, the I/O ports 1105 may be connected via one or more cables to one or more other network devices or clients. The network processing unit 1115 may use information included in the network data received at the node 1100, as well as information stored in the tables 1120, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for assessing a physical network topology's performance for a deployment of an application, the method comprising:
   receiving a request for a set of virtual machines (VMs) to be configured in a logical network topology for an application with one or more expected performance values;
   identifying a set of candidate physical network topology deployments for the set of VMs for the logical network topology of the application;
   for each candidate physical network topology deployment of the set of VMs:
      determining values for one or more metrics for a performance set related, at least in part, to one or more of the expected performance values, the one or more metrics comprising at least one of:
         a maximum throughput metric of the candidate physical network topology deployment and responsive to one of the one or more metrics being maximum throughput metric and responsive to a candidate physical network topology deployment of the set of candidate physical network topology deployments having one or more existing VMs operating on the physical network topology deployment, determining a sum of incoming residual capacity and a sum of outgoing capacity of the physical network topology deployment to obtain a utilization metric;
         a latency metric that is based upon latency in the candidate physical network topology deployment and latency in the logical network topology; and
         a network resource usage metric that is based upon at least one network resource usage of the candidate physical network topology deployment and at least one corresponding network resource usage of the logical network topology; and
      using at least one or more of the values for the one or more metrics of the performance set to obtain a final performance gauge; and
   based upon the final performance gauges, selecting the candidate physical network topology deployment that corresponds to the best final performance gauge as the physical network topology upon which the set of virtual machines will be deployed.

2. The computer-implemented method of claim 1 further comprising:
   deploying the set of VMs for the application according to the selected physical network topology deployment.

3. The computer-implemented method of claim 1 wherein the step of using the performance set to obtain a final performance gauge comprises:
   applying one or more weighting factors to one or more of the values for the one or more metrics of the performance set to obtain the final performance gauge.

4. The computer-implemented method of claim 3 wherein the one or more weighting factors are application-type specific and are related to at least one of the one or more expected performance values for the application.

5. The computer-implemented method of claim 1 wherein the step of using the performance set to obtain a final performance gauge comprises:
   using a trained function that receives as an input the performance set and output the final performance gauge.

6. A non-transitory computer-readable medium or media comprising one or more sequences of instructions which, when executed by at least one processor, causes steps to be performed comprising:
   receiving a request for a set of virtual machines (VMs) to be configured in a logical network topology for an application with one or more expected performance values;
   identifying a set of candidate physical network topology deployments for the set of VMs for the logical network topology of the application;
   for each candidate physical network topology deployment of the set of VMs:
      determining values for one or more metrics for a performance set related, at least in part, to one or more of the expected performance values, the one or more metrics comprising at least one of:
- a maximum throughput metric of the candidate physical network topology deployment and responsive to one of the one or more metrics being maximum throughput metric and responsive to a candidate physical network topology deployment of the set of candidate physical network topology deployments having one or more existing VMs operating on the physical network topology deployment, determining a sum of incoming residual capacity and a sum of outgoing capacity of the physical network topology deployment to obtain a utilization metric;
- a latency metric that is based upon latency in the candidate physical network topology deployment and latency in the logical network topology; and
- a network resource usage metric that is based upon at least one network resource usage of the candidate physical network topology deployment and at least one corresponding network resource usage of the logical network topology; and using at least one or more of the values for the one or more metrics of the performance set to obtain a final performance gauge; and based upon the final performance gauges, selecting the candidate physical network topology deployment that corresponds to the best final performance gauge as the physical network topology upon which the set of virtual machines will be deployed.

7. The non-transitory computer-readable medium or media of claim 6 further comprising:
deploying the set of VMs for the application according to the selected physical network topology deployment.

8. The non-transitory computer-readable medium or media of claim 6 wherein the step of using the performance set to obtain a final performance gauge comprises:
applying one or more weighting factors to one or more of the values for the one or more metrics of the performance set to obtain the final performance gauge.

9. The non-transitory computer-readable medium or media of claim 8 wherein the one or more weighting factors are application-type specific and are related to at least one of the one or more expected performance values for the application.

10. The non-transitory computer-readable medium or media of claim 6 wherein the step of using the performance set to obtain a final performance gauge comprises:
using a trained function that receives as an input the performance set and output the final performance gauge.

11. An information handling system comprising:
one or more processors; and
a non-transitory computer-readable medium or media comprising one or more sequences of instructions which, when executed by at least one of the one or more processors, causes steps to be performed comprising:
receiving a request for a set of virtual machines (VMs) to be configured in a logical network topology for an application with one or more expected performance values;
identifying a set of candidate physical network topology deployments for the set of VMs for the logical network topology of the application;
for each candidate physical network topology deployment of the set of VMs:
determining values for one or more metrics for a performance set related, at least in part, to one or more of the expected performance values, the one or more metrics comprising at least one of:
- a maximum throughput metric of the candidate physical network topology deployment and responsive to one of the one or more metrics being maximum throughput metric and responsive to a candidate physical network topology deployment of the set of candidate physical network topology deployments having one or more existing VMs operating on the physical network topology deployment, determining a sum of incoming residual capacity and a sum of outgoing capacity of the physical network topology deployment to obtain a utilization metric;
- a latency metric that is based upon latency in the candidate physical network topology deployment and latency in the logical network topology; and
- a network resource usage metric that is based upon at least one network resource usage of the candidate physical network topology deployment and at least one corresponding network resource usage of the logical network topology; and using at least one or more of the values for the one or more metrics of the performance set to obtain a final performance gauge; and based upon the final performance gauges, selecting the candidate physical network topology deployment that corresponds to the best final performance gauge as the physical network topology upon which the set of virtual machines will be deployed.

12. The information handling system of claim 11 wherein the non-transitory computer-readable medium or media further comprises one or more sequences of instructions which, when executed by at least one of the one or more processors, causes steps to be performed comprising:
deploying the set of VMs for the application according to the selected physical network topology deployment.

13. The information handling system of claim 11 wherein the step of using the performance set to obtain a final performance gauge comprises:
applying one or more weighting factors to one or more of the values for the one or more metrics of the performance set to obtain the final performance gauge.

14. The information handling system of claim 11 wherein the step of using the performance set to obtain a final performance gauge comprises:
using a trained function that receives as an input the performance set and output the final performance gauge.

15. The computer-implemented method of claim 1 wherein at least one of the network resource usage metrics is number of links used by the candidate physical network topology deployment.

16. The computer-implemented method of claim 2 further comprising:
applying back pressure on one or more sets of links in the selected physical network topology deployment to reduce their usage rates to accommodate one or more of the virtual machines from the set of virtual machines.

17. The non-transitory computer-readable medium or media of claim 6 wherein at least one of the network resource usage metrics is number of links used by the candidate physical network topology.

18. The non-transitory computer-readable medium or media of claim 7 further comprising:
   applying back pressure on one or more sets of links in the selected physical network topology deployment to reduce their usage rates to accommodate one or more of the virtual machines from the set of virtual machines.

19. The information handling system of claim 11 wherein at least one of the network resource usage metrics is number of links used by the candidate physical network topology.

20. The information handling system of claim 12 wherein the non-transitory computer-readable medium or media further comprises one or more sequences of instructions which, when executed by at least one of the one or more processors, causes steps to be performed comprising:
   applying back pressure on one or more sets of links in the selected physical network topology deployment to reduce their usage rates to accommodate one or more of the virtual machines from the set of virtual machines.

* * * * *